US012794217B2

(12) United States Patent
Popovic Sandberg et al.

(10) Patent No.: US 12,794,217 B2
(45) Date of Patent: Nov. 10, 2026

(54) ARRANGEMENT AND METHOD FOR FAULT PROTECTION OF TERMINAL BOX OF ELECTRIC ROTATING MACHINE

(71) Applicant: ABB Schweiz AG, Baden (CH)

(72) Inventors: Alexandra Popovic Sandberg, Västerås (SE); Christian Payerl, Arboga (SE)

(73) Assignee: ABB SCHWEIZ AG, Baden (CH)

( * ) Notice: Subject to any disclaimer, the term of this patent is extended or adjusted under 35 U.S.C. 154(b) by 222 days.

(21) Appl. No.: 18/547,948

(22) PCT Filed: Mar. 1, 2022

(86) PCT No.: PCT/EP2022/055143
§ 371 (c)(1),
(2) Date: Aug. 25, 2023

(87) PCT Pub. No.: WO2022/184708
PCT Pub. Date: Sep. 9, 2022

(65) Prior Publication Data

US 2025/0015586 A1 Jan. 9, 2025

(30) Foreign Application Priority Data

Mar. 3, 2021 (EP) ..................................... 21160465

(51) Int. Cl.
*H02P 9/02* (2006.01)
*H02H 1/00* (2006.01)
(Continued)

(52) U.S. Cl.
CPC ............ *H02H 7/08* (2013.01); *H02H 1/0023* (2013.01); *H02K 5/225* (2013.01)

(58) Field of Classification Search
CPC .. H02H 3/38; H02H 3/52; H02H 5/12; H02H 7/222; H02H 9/08; H02H 1/00;
(Continued)

(56) References Cited

U.S. PATENT DOCUMENTS 5,192,888 A * 3/1993 Fleer ...................... H02K 5/225 310/71
5,933,308 A 8/1999 Garzon
(Continued)

FOREIGN PATENT DOCUMENTS

EP 1876627 A2 1/2008
EP 1876627 A3 7/2008
(Continued)

OTHER PUBLICATIONS

European Search Resport; Application No. 21160465.7; Completed: Aug. 11, 2021; Mailing Date: Aug. 20, 2021; 7 Pages.
(Continued)

*Primary Examiner* — David Luo
*Assistant Examiner* — Charles S Laughlin
(74) *Attorney, Agent, or Firm* — Greenberg Traurig, LLP

(57) ABSTRACT

A method for fault protection of a terminal box of an electric rotating machine, and an arrangement including a terminal box for an electric rotating machine for electrically connecting the electric rotating machine to an electric system for transmitting electric power between the electric system and the electric rotating machine in one or more phases via the terminal box, a detection means configured to detect an electric arc inside the terminal box, and a switching means configured to electrically connect each of the one or more phases to earth in response to the detection means detecting the electric arc inside the terminal box or in response to the detection means detecting the electric arc inside the terminal box and one or more predetermined conditions being satisfied.

18 Claims, 4 Drawing Sheets

(51) Int. Cl.
*H02H 7/08* (2006.01)
*H02K 5/22* (2006.01)
*H02P 9/00* (2006.01)

(58) Field of Classification Search
CPC .... H02H 1/0076; H02H 1/0084; H02H 1/063; H02H 3/025; H02H 3/027; H02H 3/066; H02H 3/083; H02H 3/14; H02H 3/50; H02H 5/04; H02H 7/08; H02H 7/0805; H02H 7/1213
See application file for complete search history.

(56) References Cited

U.S. PATENT DOCUMENTS

| | | | | |
|---|---|---|---|---|
| 8,339,755 B2 * | 12/2012 | Joshi | H02H 3/04 | 361/62 |
| 2003/0030954 A1 * | 2/2003 | Bax | H02H 1/06 | 361/87 |
| 2010/0033888 A1 * | 2/2010 | Dougherty | G01R 31/54 | 702/58 |
| 2015/0138684 A1 * | 5/2015 | Chung | H02H 3/093 | 361/94 |
| 2018/0026434 A1 * | 1/2018 | Keller | H02M 1/32 | 363/13 |

FOREIGN PATENT DOCUMENTS

| | | |
|---|---|---|
| EP | 1993181 A2 | 11/2008 |
| EP | 1993181 A3 | 3/2012 |

OTHER PUBLICATIONS

PCT International Search Report and Written Opinion of the International Searching Authority; Application No. PCT/EP2022/055143; Completed: Jul. 6, 2022; Mailing Date: Jul. 15, 2022; 11 Pages.

* cited by examiner

ARRANGEMENT AND METHOD FOR FAULT PROTECTION OF TERMINAL BOX OF ELECTRIC ROTATING MACHINE

TECHNICAL FIELD

The present invention relates to an arrangement and a method for fault protection of a terminal box of an electric rotating machine.

BACKGROUND

An electric connection of an electric rotating machine, such as a synchronous or asynchronous electric rotating machine, to an electric system, such as an electric grid or network, may be done via a terminal box associated with the machine. There may be one or more terminal boxes associated with one machine and one of them may be a main terminal box via which electric power between the electric rotating machine and the connected electric system may be mainly transmitted, for example. Such a terminal box of the electric rotating machine may be designed based on a rating of the machine, such as fault current rating of the machine, for instance.

A problem associated with the above arrangement is that in some situations, e.g. several machines are connected to a same bus, a fault current possibly flowing in or through the terminal box may exceed the capacity of the terminal box which may result in severe damage to the terminal box and the electric rotating machine. This may also increase the risk of damage to the surroundings of the machine and hence also the risk for an impact on the personal safety for operators increases.

A possible solution is to increase the fault current strength of the terminal box but the required fault current strength level may not always be known in advance and over dimensioning of the fault current strength level of the terminal box may be expensive and/or difficult because of size or other mechanical limitations of the terminal box, for example.

SUMMARY

An object of the present invention is thus to provide a method and an apparatus for implementing the method so as to overcome the above problem or at least to alleviate the problem. The objects of the invention are achieved by a method and an arrangement which are characterized by what is stated in the independent claims. The preferred embodiments of the invention are disclosed in the dependent claims.

The invention is based on the idea of detecting an electric arc inside the terminal box, and in response to the detecting of the electric arc inside the terminal box or in response to the detecting of the electric arc inside the terminal box and one or more predetermined conditions being satisfied electrically connecting each of one or more phases, via which electric power between the electric rotating machine and an electric system connected thereto is transmitted, to earth.

An advantage provided by the solution of the invention is that a fault situation involving a high fault current and causing an electric arc inside the terminal box may be detected and eliminated in an efficient manner. The solution of the invention can also reduce requirements for a mechanical withstand level of the terminal box against high fault currents and consequent pressure build-up in the terminal box.

BRIEF DESCRIPTION OF THE DRAWINGS

In the following the invention will be described in greater detail by means of preferred embodiments with reference to the accompanying drawings, in which.

DETAILED DESCRIPTION

The following embodiments are exemplary. Although the description may refer to "an", "one", or "some" embodiment(s) in several locations, this does not necessarily mean that each such reference is to the same embodiment(s), or that the feature only applies to a single embodiment, for example. Single features of different embodiments may also be combined to provide other embodiments. Generally, all terms and expressions used should be interpreted broadly and they are intended to illustrate, not to restrict, the embodiments. The figures only show components necessary for understanding the various embodiments. The number and/or shape of the various elements, and generally their implementation, could vary from the examples shown in the figures.

According to an embodiment, an arrangement comprises a terminal box for an electric rotating machine for electrically connecting the electric rotating machine to an electric system for transmitting electric power between the electric system and the electric rotating machine in one or more phases via the terminal box. The arrangement further comprises a detection means configured to detect an electric arc inside the terminal box, and a switching means configured to electrically connect each of the one or more phases to earth in response to the detection means detecting the electric arc inside the terminal box or in response to the detection means detecting the electric arc inside the terminal box and one or more predetermined conditions being satisfied.

Figure 1:
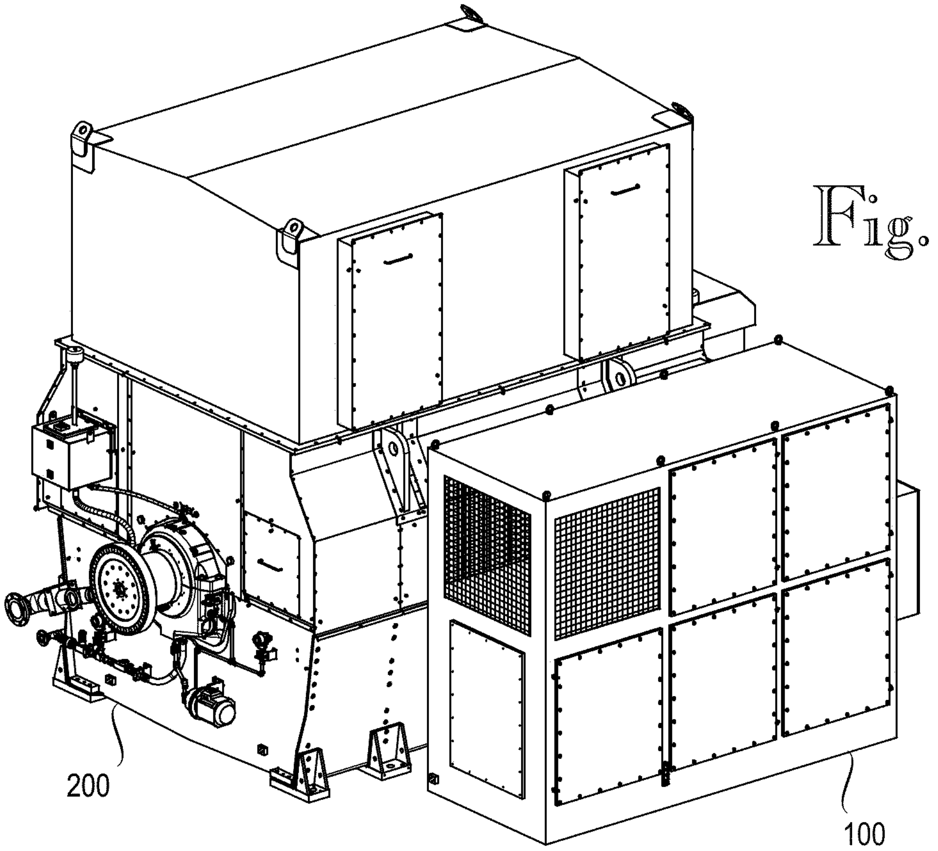
FIG. 1 illustrates an example of a terminal box of an electric rotating machine according to an embodiment.
Figure 2:
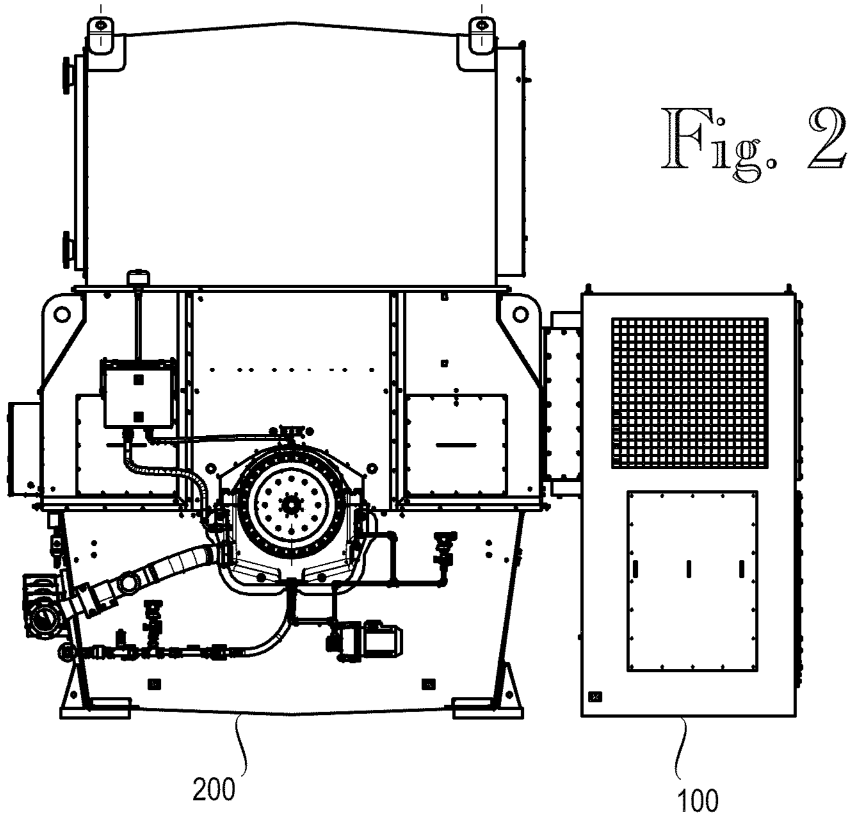
FIG. 2 illustrates an example of a terminal box of an electric rotating machine according to an embodiment.

FIGS. 1 and 2 illustrate an example of a terminal box 100 for an electric rotating machine 200. The shape and size of the terminal box 100 may vary and may be selected on the basis of the characteristics of the electric rotating machine 200, for example. The terminal box 100 may be fastened to a housing of the electric rotating machine 200, as shown in the examples, or it could be physically separate from the electric rotating machine 200. The fastening location of the terminal box 100 to the housing of the electric rotating machine 200 may also vary. The terminal box 100 may be the main terminal box of the rotating machine 200. The electric rotating machine 200 may be a motor, a generator or a machine which can be operated both as a motor and a generator. The electric rotating machine 200 may be a single-phase AC machine or a multi-phase AC machine with a plurality of phases such that the number of phases is e.g. 3 or greater than 3. Possible examples of a generator include a synchronous AC generator and an asynchronous AC generator, e.g. an induction generator, for example. Possible examples of a motor include an asynchronous AC motor, e.g. an induction motor, and a synchronous AC motor. Possible examples of the synchronous AC motor include a reluctance motor, a hysteresis motor, a permanent magnet motor, and DC-excited motors, for example. Moreover, a further example is a synchronous AC motor used as a synchronous condenser.

Figure 3:
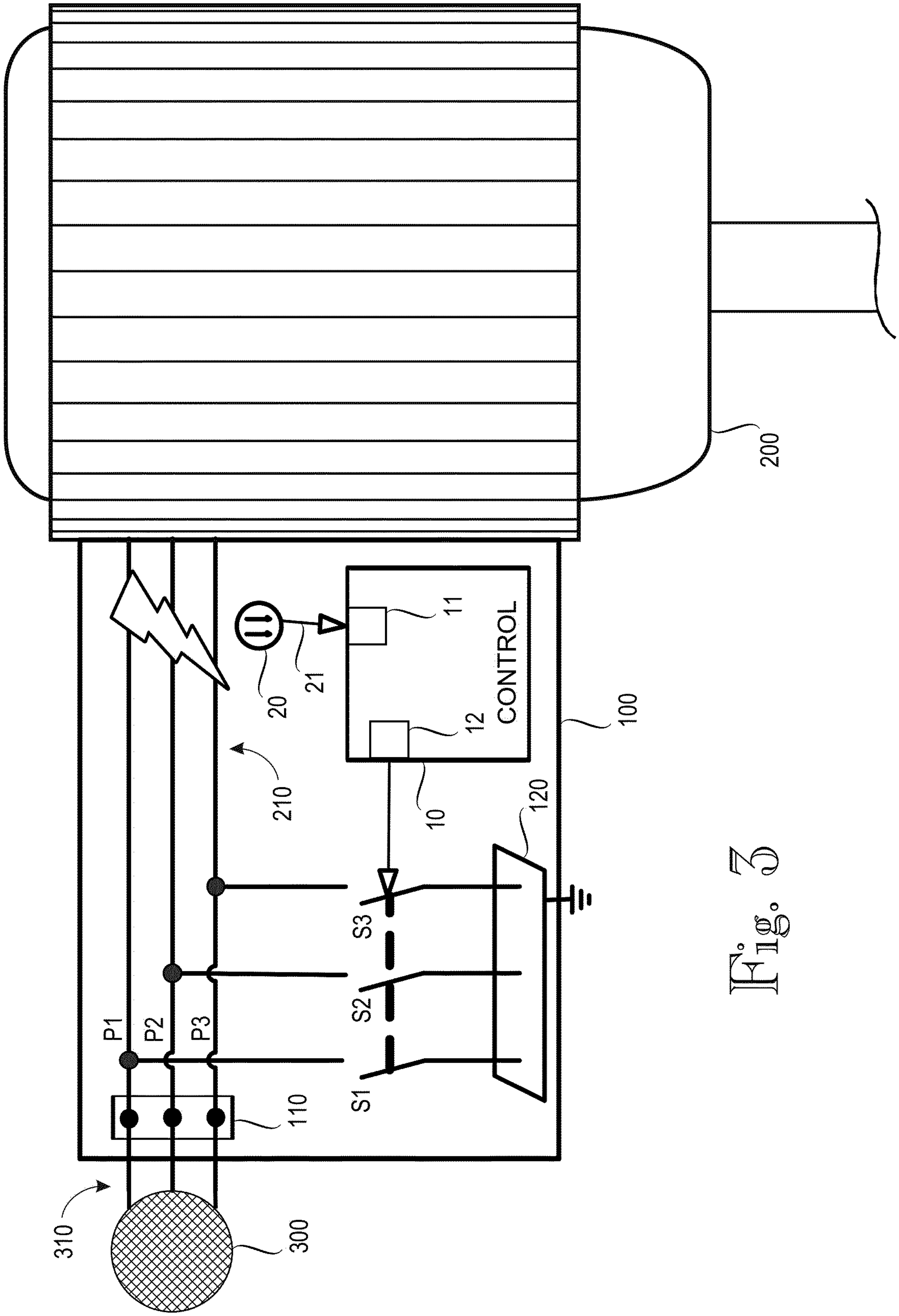
FIG. 3 illustrates a connection diagram of an arrangement according to an embodiment.

FIG. 3 illustrates a connection diagram of an arrangement according to an embodiment. The exemplary arrangement comprises a terminal box 100 for an electric rotating machine 200. The example further shows a three phase AC connection 310 between the terminal box 100 and an electric system 300, which may an AC network or grid, for example. The terminal box 100 may comprise connection terminals 110, or generally any suitable connection means enabling the electrical connection of the connecting line 310. Such connection terminals 110 may comprise phase specific terminals with e.g. screw fastening or any other suitable means of fastening. The terminal leads 210 of the electric rotating machine 200 can be electrically connected, either directly or indirectly via one or more further connecting elements, to respective ones of the connection terminals 110 of the terminal box 100. Such further connecting elements within the terminal box 100 could comprise e.g. busbars connected between the terminal leads 210 of the electric rotating machine 200 and the connecting line 310. Consequently, the electric rotating machine 200 can be electrically connected to the electric system 300 via the terminal box 100 for transmitting electric power between the electric system 300 and the electric rotating machine 200 in one or more phases P1, P2, P3.

According to an embodiment, the detection means comprise at least one optical arc sensor 20 arranged inside the terminal box 100. There may be more than one optical arc sensor 20, i.e. two or more optical arc sensors 20, arranged inside the terminal box 100 depending on the size and/or shape of the terminal box 100, for example. An optical arc sensor 20 may be implemented by a light collecting sensor device, which is connected to a control arrangement 10, via an optical fibre connection 21 comprising at least one optical fibre. Thus, the light collected by the optical arc sensor 20 can be transmitted from optical arc sensor 20 to the control arrangement 10 via the optical fibre of the optical fibre connection 21. The at least one optical arc sensor 20 may be physically arranged inside the terminal box 100 such that it/they can best detect the light from an arc flash occurring inside the terminal box 100. The physical mounting location for the at least one optical arc sensor 20 may thus be determined depending on the characteristics of the terminal box 100. As an example, at least one optical arc sensor 20 could be physically located near the connection terminals 110 of the terminal box 100 and/or near an entry point of the incoming connection line 310 to the terminal box 100. Such entry point of the incoming connection line 310 to the terminal box 100 could comprise a gland plate or separate gaskets for the connection line 310, for instance. Suitable connection lugs (not shown in the figures) or similar connection means may be provided for fastening the at least one optical arc sensor 20 to the structures of the terminal box, for instance. The control arrangement 10 may comprise a detection unit 11 or units for the detection of the electric arc flash. The detection means may thus be implemented by means of such a detection unit or units 11, which receives the light collected by the optical arc sensor 20 and can then detect an arc flash on the basis of the received light signal. One or more optical arc sensors 20 could also be physically fastened to or integrated into the detection unit 11 or generally to the control arrangement 10, for example.

According to an embodiment, the switching means comprise, for each of the one or more phases P1, P2, P3, a switching assembly S1, S2, S3 configured to electrically connect the phase to earth. In the example of FIG. 3, the switching assembly for each one of the phases P1, P2, P3 is represented by a single phase-specific switching element S1, S2, S3 connected between the respective phase P1, P2, P3 and an earthing bar 120 within the terminal box 100. In use, the earthing bar 120 of the terminal box 100 is connected to earth (ground) as illustrated thus providing a path to earth. The earthing bar 120 could also be omitted or there could be other connecting elements provided instead. There could also be more than one switching element in the switching assembly for each phase P1, P2, P3, for instance. Generally, the connection of each phase-specific switching assembly S1, S2, S3 to the respective phase P1, P2, P3 within the terminal box 100 is preferably made near the connection terminals 110 of the terminal box 100 and/or near an entry point of the incoming connection line 310 to the terminal box 100.

According to an embodiment, the switching assembly for each phase P1, P2, P3 comprises at least one switching element S1, S2, S3. According to an embodiment, the at least one switching element S1, S2, S3 is a high-speed switching element. Consequently, each of the exemplary phase-specific switching elements S1, S2, S3 in the figure could be such a high-speed switching element. Term high-speed switching element herein generally refers to an element that is capable of performing a high-speed switching. According to an embodiment, the at least one switching element S1, S2, S3 may be gas-propelled. Moreover, according to an embodiment, the at least one switching element S1, S2, S3 comprises a vacuum interrupter. An example of a gas-propelled high-speed switching element comprising a vacuum interrupter that may be utilized as switching elements S1, S2, S3 is disclosed in EP 2159813 A1. Also other kinds of high-speed switching elements utilizing different technologies could be used, such as high-speed switching elements utilizing e.g. pyrotechnical elements or spring mechanisms or any combinations thereof. According to an embodiment, the at least one switching element S1, S2, S3 for each phase P1, P2, P3 may be arranged inside the terminal box 100. Alternatively, the at least one switching element S1, S2, S3 for each phase P1, P2, P3 may be arranged outside the terminal box 100, e.g. in a separate housing preferably near or adjacent to the terminal box 100. The control arrangement 10 may comprise a tripping unit 12 or units for the tripping of the at least one switching element S1, S2, S3 for each phase P1, P2, P3 in response to the detection means detecting the electric arc inside the terminal box 100. The switching means may thus be implemented by means of such a tripping unit or units 12, which are responsive to the detection of an arc flash by the detection unit 11 and capable of tripping the switching elements S1, S2, S3, i.e. controlling the switching elements S1, S2, S3 from their open (non-conducting) state into their closed (conducting) state, and thus short-circuiting the phases P1, P2, P3 to earth. As an example, the detection means and the switching means could be implemented by utilizing the system available with trade name UFES™ from company ABB AG, Oberhausener Strasse 33, 40472 Ratingen, Germany.

According to an embodiment, the switching means are configured to electrically connect each of the one or more phases to earth in response to the detection means detecting the electric arc inside the terminal box or in response to the detection means detecting the electric arc inside the terminal box and one or more predetermined conditions being satisfied. Thus, the detection of the electric arc inside the terminal box 100 could be the only criterion for the tripping of the at least one switching element S1, S2, S3 for each phase P1, P2, P3 to electrically connect each of the one or more phases to earth, such that each time an electric arc is detected inside the terminal box, each of the one or more phases P1, P2, P3 is electrically connected to earth. Alternatively, in addition to the detection of the electric arc inside the terminal box 100 one or more predetermined conditions need to be additionally satisfied for the tripping of the at least one switching element S1, S2, S3 for each phase P1, P2, P3 to be carried out. According to an embodiment, the one or more predetermined conditions may comprise a condition, where a current value at a predetermined detection point exceeds a predetermined threshold value. As an example, it is possible to monitor the current flowing in the connection 310 between the terminal box 100 and the electric system 300, or in another location, and then perform the tripping of the at least one switching element S1, S2, S3 for each phase P1, P2, P3 to electrically connect each of the one or more phases to earth only if both an electric arc inside the terminal box 100 is detected and the monitored current exceeds a predetermined threshold value. Thus, such monitoring of a current, or a quantity indicative thereof, may be additionally used as a condition to trip the switching element S1, S2, S3 for each phase P1, P2, P3 to electrically connect each of the one or more phases to earth. A possible further requirement may be that detection of the electric arc inside the terminal box 100 and the fulfilment of the one or more predetermined conditions need to take place essentially simultaneously or within a time period of a predetermined length, for example, in order for the tripping of the at least one switching element S1, S2, S3 for each phase P1, P2, P3 to be carried out. According to an embodiment, the switching means may be further configured to electrically connect each of the one or more phases to earth also in response to such one or more predetermined conditions being satisfied. Thus, it is possible that when the one or more predetermined conditions, such as the described current condition, is satisfied, the tripping of the at least one switching element S1, S2, S3 for each phase P1, P2, P3 to electrically connect each of the one or more phases to earth is performed even without an electric arc inside the terminal box 100 being detected. This kind of additional functionality may be optionally used as an additional protection measure in case the detection of the electric arc inside the terminal box 100 fails or no electric arc occurs inside the terminal box 100 in a fault situation, for instance.

Figure 4:
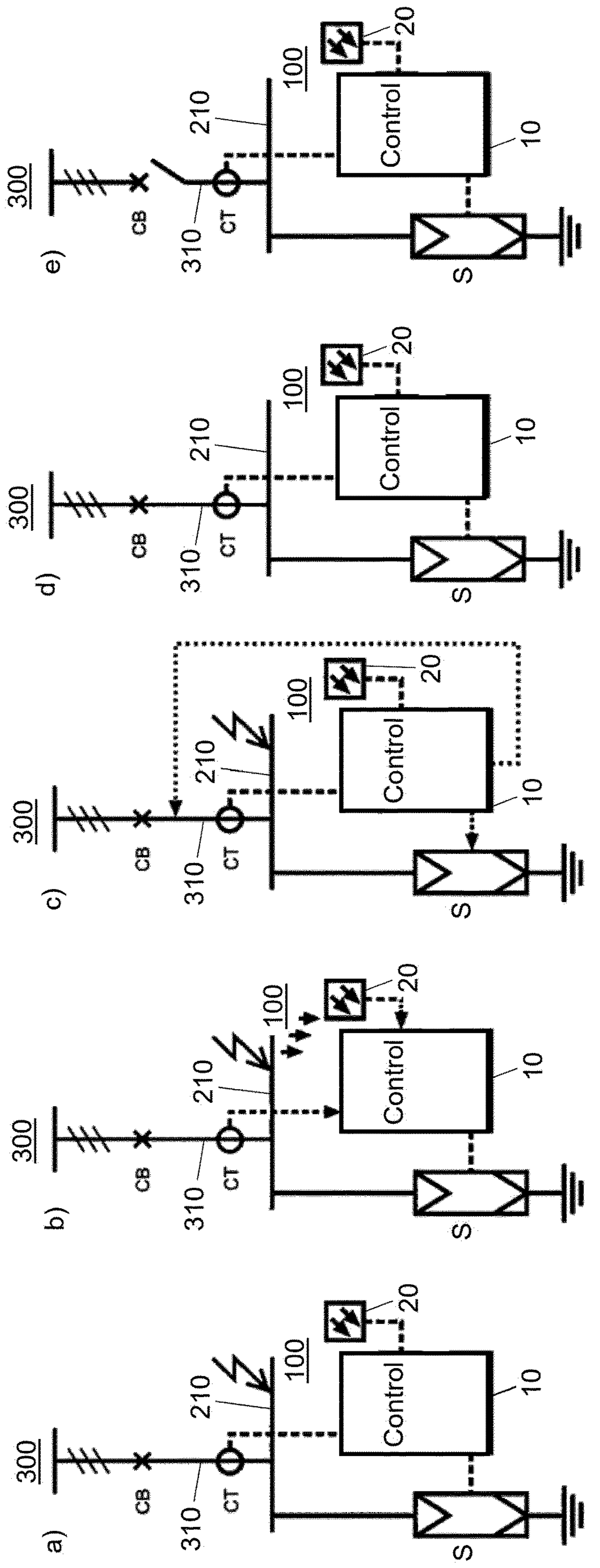
FIG. 4 illustrates a diagram of a sequence of operations according to an embodiment.

FIG. 4 illustrates an exemplary diagram of a sequence of operations according to an embodiment. In the figure, in stage a), an electric arc occurs within the terminal box 100. In stage b), the light coming from the electric arc is collected by the optical arc sensor 20 and sent to the control arrangement 10. Optionally the fault current in the connection line 310 is detected by the current transformer CT and also sent to the control arrangement 10. In stage c), the control arrangement triggers the phase-specific switching assemblies S to short-circuit the phases to earth based on the detection of the electric arc or on the detection of the electric arc and the monitored current. In stage d), the electric arc is extinguished because of the short-circuiting performed by the phase-specific switching assemblies S. In stage e), a circuit breaker CB is opened to break the fault current flowing in the connection line 310. The control of the circuit breaker CB may be realized by the control arrangement 10, for example.

The solution according to any of the embodiments described herein is of particular advantage in applications where the electric rotating machine 200 creates a DC component during a fault. As an example, a synchronous generator or a synchronous motor, e.g. used to implement a synchronous condenser, may produce a DC component in a fault situation. Such a DC component in the resulting fault current may prevent a conventional circuit breaker from interrupting the fault current quickly enough, at least without damage to the circuit breaker. When the electric rotating machine 200 is equipped with the solution according to any of the embodiments described herein, the short-circuiting of the one or more phases to earth upon detection of an electric arc inside the terminal box 100 of the electric rotating machine 200 can effectively protect the electric rotating machine 200 fast enough to prevent the fault from spreading and any damage to the surroundings. Generally, the solution according to any of the embodiments described herein can prevent rapid pressure and temperature rise in the terminal box 100 leading to a reduction in both repair and consequential costs by avoiding possibly heavy damages of the surrounding environment, and at the same time can provide an active protection for both the equipment and personnel, for example. The solution thus enables the machine and the terminal box thereof to operate safer and to tolerate higher fault currents. The solution according to any of the embodiments described herein may allow several machines to be connected to e.g. a common bus or transformer leg, and/or via a connecting transformer with a low impedance, allowing higher fault contributions of the machines to the grid.

Figure 5:
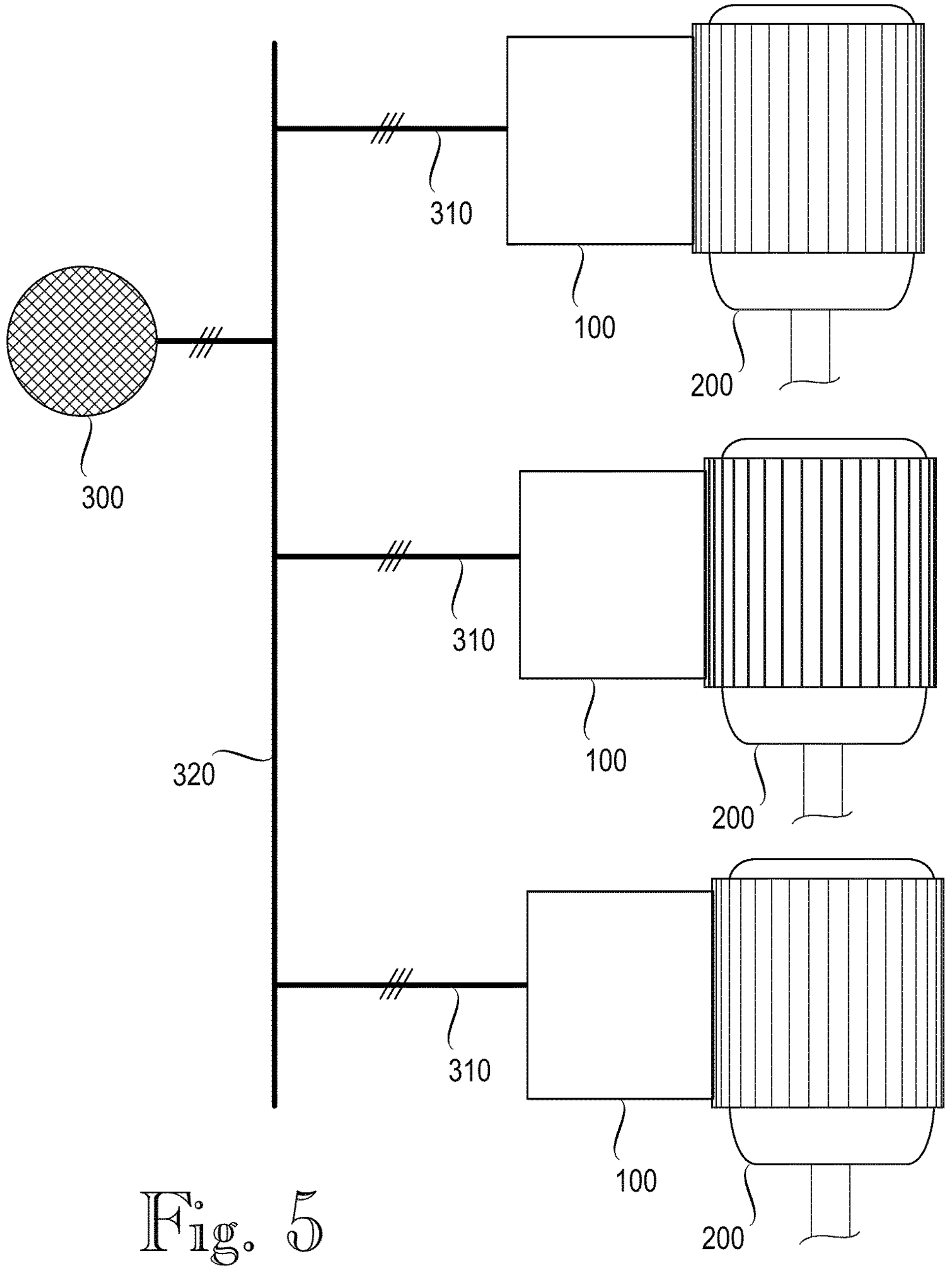
FIG. 5 illustrates an example of a configuration according to an embodiment.

FIG. 5 shows an example of a configuration comprising two or more, in this example three, electric rotating machines 200 each with a respective terminal box 100 connected to a common bus 320, which may further be connected to an electric system 300. Each of the electric rotating machines 200 is equipped with the solution according to any of the embodiments described herein, e.g. as described in connection with FIG. 3, which enables the connection of multiple machines to the common connection point, such as the exemplary bus 320, without necessarily requiring any additional mechanical design changes to the machines 200 or their terminal boxes 100, as faults involving an electric arc within the terminal box 100 can be effectively eliminated before they can cause damage. In other words, the use of the solution according to any of the embodiments described herein can effectively increase the fault current withstand capability or rating of the electric rotating machine 200 and its terminal box 100, because of the added fault clearance capability. Then the electric rotating machine 200 and its terminal box 100 can be used in such a configuration in which the possible fault current level may exceed a continuous fault current withstand capability of the electric rotating machine 200 and its terminal box 100, for example.

The control arrangement 10 or other means controlling operation of the protective arrangement, or one or more components thereof, according to any one of the embodiments herein, or a combination thereof, may be implemented as one physical unit or as two or more separate physical units that are configured to implement the functionality of the various embodiments. Herein the term 'unit' generally refers to a physical or logical entity, such as a physical device or a part thereof or a software routine. The control arrangement 10 according to any one of the embodiments may be implemented at least partly by means of one or more computers or corresponding digital signal processing (DSP) equipment provided with suitable software, for example. Such a computer or digital signal processing equipment preferably comprises at least a working memory (RAM)

providing storage area for arithmetical operations, and a central processing unit (CPU), such as a general-purpose digital signal processor. The CPU may comprise a set of registers, an arithmetic logic unit, and a control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the various embodiments, or a part thereof, may further comprise suitable input means for receiving e.g. measurement and/or control data, and output means for outputting e.g. control or other data. It is also possible to use a specific integrated circuit or circuits, or discrete electric components and devices for implementing the functionality according to any one of the embodiments.

Present protection systems and components thereof may comprise processors and memory that may be utilized in implementing the functionality according to the various embodiments described herein. Thus, at least some modifications and configurations possibly required for implementing an embodiment could be performed as software routines, which may be implemented as added or updated software routines. If at least part of the functionality of any of the embodiments is implemented by software, such software may be provided as a computer program product comprising computer program code which, when run on a computer, causes the computer or corresponding arrangement to perform the functionality according to the embodiments as described herein. Such a computer program code may be stored or generally embodied on a computer readable medium, such as suitable memory, e.g. a flash memory or an optical memory, from which it is loadable to the unit or units executing the program code. In addition, such a computer program code implementing any of the embodiments may be loaded to the unit or units executing the computer program code via a suitable data network, for example, and it may replace or update a possibly existing program code.

It will be obvious to a person skilled in the art that, as the technology advances, the inventive concept can be implemented in various ways. The invention and its embodiments are not limited to the examples described above but may vary within the scope of the claims.

The invention claimed is:

1. An arrangement comprising:
an electric rotating machine;
a terminal box for the electric rotating machine for electrically connecting the electric rotating machine to an electric system for transmitting electric power between the electric system and the electric rotating machine in one or more phases via the terminal box;
a detector configured to detect an electric arc inside the terminal box; and
a switch configured to electrically connect each of the one or more phases to earth in response to the detector detecting the electric arc inside the terminal box or in response to the detector detecting the electric arc inside the terminal box and one or more predetermined conditions being satisfied;
wherein the terminal box is fastened to a housing of the electric rotating machine.

2. The arrangement of claim 1, wherein the detector comprises at least one optical arc sensor arranged inside the terminal box.

3. The arrangement of claim 1, wherein the switch comprises, for each of the one or more phases, a switching assembly configured to electrically connect the phase to earth.

4. The arrangement of claim 3, wherein the switching assembly comprises at least one switching element.

5. The arrangement of claim 4, wherein the at least one switching element is a high-speed switching element.

6. The arrangement of claim 5, wherein the at least one switching element is gas-propelled.

7. The arrangement of claim 4, wherein the at least one switching element is arranged inside the terminal box.

8. The arrangement of claim 1, wherein the one or more predetermined conditions comprise a condition, where a current value at a predetermined detection point exceeds a predetermined threshold value.

9. The arrangement of claim 1, wherein the electric rotating machine is a motor and/or a generator.

10. The arrangement of claim 1, wherein the terminal box is the main terminal box of the rotating machine.

11. The arrangement of claim 10, wherein the terminal box comprises connection terminals, and wherein terminal leads of the electric rotating machine are electrically connected to respective ones of the connection terminals of the terminal box.

12. A method for fault protection of a terminal box of an electric rotating machine, the method comprising:
transmitting electric power between the electric rotating machine and an electric system in one or more phases via the terminal box of the electric rotating machine;
detecting an electric arc inside the terminal box; and
electrically connecting each of the one or more phases to earth in response to the detecting of the electric arc inside the terminal box or in response to the detecting of the electric arc inside the terminal box and one or more predetermined conditions being satisfied;
wherein the terminal box is fastened to a housing of the electric rotating machine.

13. The method of claim 12, wherein the electrically connecting of each of the one or more phases to earth is performed by means of one or more high-speed switching elements within the terminal box of the electric rotating machine.

14. An electric rotating machine comprising:
a terminal box for electrically connecting the electric rotating machine to an electric system for transmitting electric power between the electric system and the electric rotating machine in one or more phases via the terminal box;
an arc detector configured to detect an electric arc inside the terminal box; and
a switching apparatus configured to electrically connect each of the one or more phases to earth in response to the arc detector detecting the electric arc inside the terminal box or in response to the arc detector detecting the electric arc inside the terminal box and one or more predetermined conditions being satisfied;
wherein the terminal box is fastened to a housing of the electric rotating machine.

15. The electric rotating machine of claim 14, wherein the terminal box is the main terminal box of the electric rotating machine and fastened to a housing of the electric rotating machine.

16. The electric rotating machine of claim 14, wherein the switching apparatus is arranged inside the terminal box.

17. The electric rotating machine of claim 14, wherein the switching apparatus comprises at least one gas-propelled switching element.

18. The electric rotating machine of claim 14, wherein the arc detector comprises at least one optical arc sensor arranged inside the terminal box.

* * * * *